Figure 1:
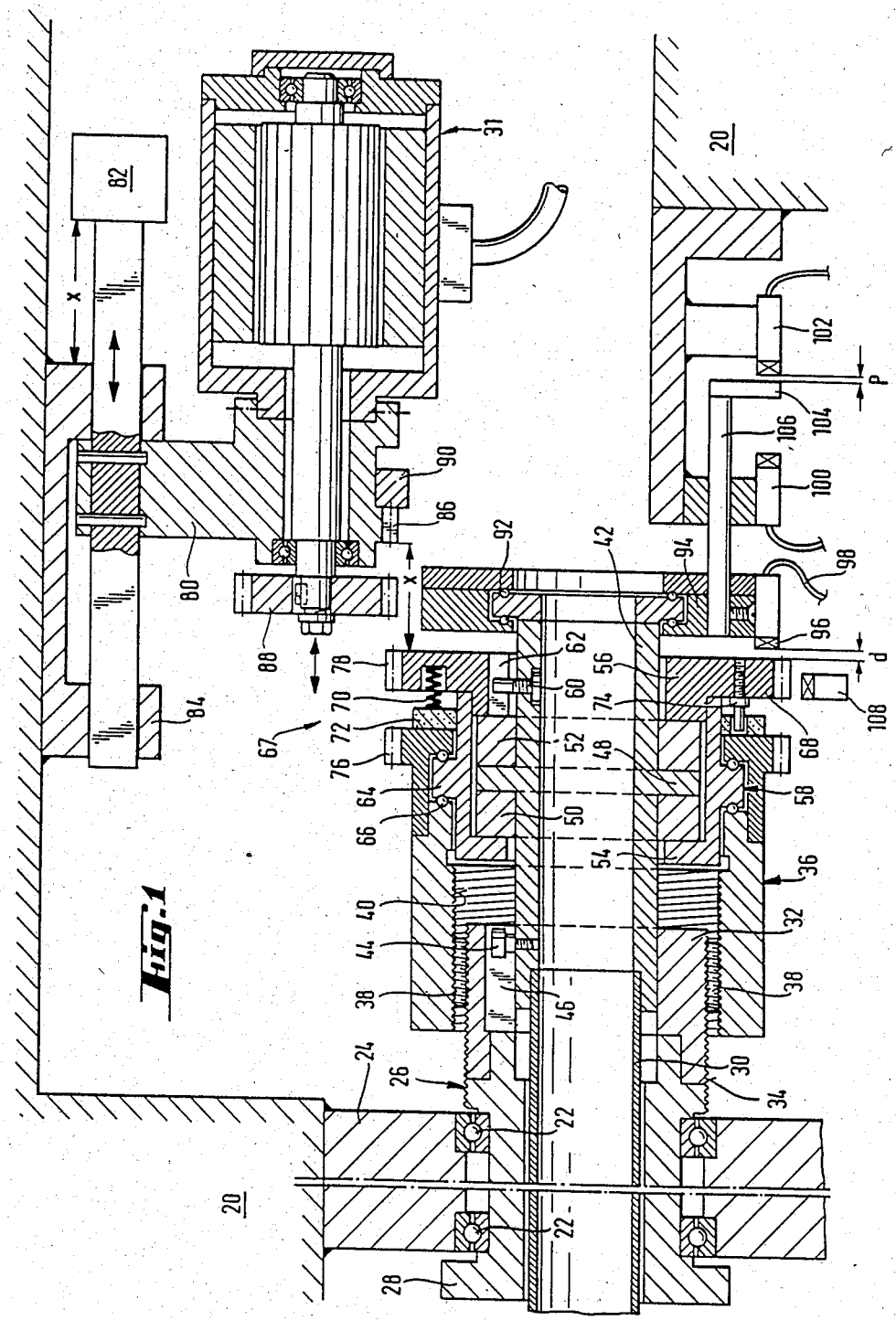

United States Patent [19]

Bald

[11] Patent Number: 4,567,794

[45] Date of Patent: Feb. 4, 1986

[54] APPARATUS FOR PRODUCING AN AXIAL CLAMPING FORCE FOR ROTATING SPINDLES, AND A METHOD OF OPERATION FOR AN APPARATUS OF THIS KIND

[76] Inventor: Hübert Bald, Schutzenstrasse 1, D-5920 Bad Berleburg, Fed. Rep. of Germany

[21] Appl. No.: 493,746

[22] Filed: May 11, 1983

[30] Foreign Application Priority Data

May 13, 1982 [DE] Fed. Rep. of Germany ....... 3218082

[51] Int. Cl.⁴ .................. B23B 1/00; B23B 19/00
[52] U.S. Cl. ................................ 82/1 C; 82/28 R; 82/1.2; 82/2 E; 82/30
[58] Field of Search ............... 279/1 M, 1 R, 1 C, 4; 82/2 B, 1.2–1.5, 28 R, 1 C, 29, 30, 67, 68, 40 R; 408/10, 133; 409/233; 310/80, 83, 191

[56] References Cited

U.S. PATENT DOCUMENTS

| | | | |
|---|---|---|---|
| 3,771,802 | 11/1973 | Hiramatu et al. | 279/4 |
| 3,815,929 | 6/1974 | Steinberger et al. | 279/4 |
| 4,080,716 | 3/1978 | von Dorp | 279/4 |
| 4,232,547 | 11/1980 | Kasper . | |
| 4,254,676 | 3/1981 | Wilson | 279/1 R |

Primary Examiner—Leonidas Vlachos
Attorney, Agent, or Firm—McCormick, Paulding & Huber

[57] ABSTRACT

A powered chuck in which a torque is transmitted to an input member and by the latter is converted with the aid of a rolling screw mechanism into an axial clamping movement, a preferably controllable return locking means being provided for the rolling screw mechanism.

23 Claims, 14 Drawing Figures

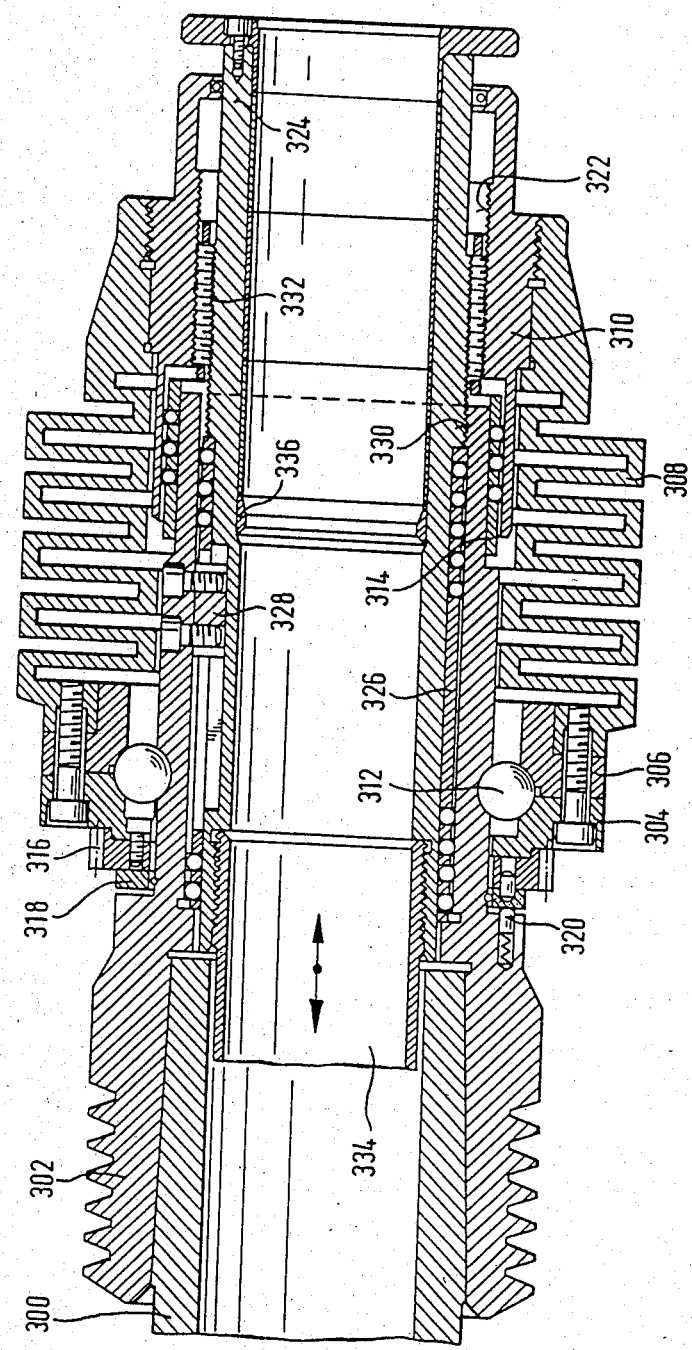

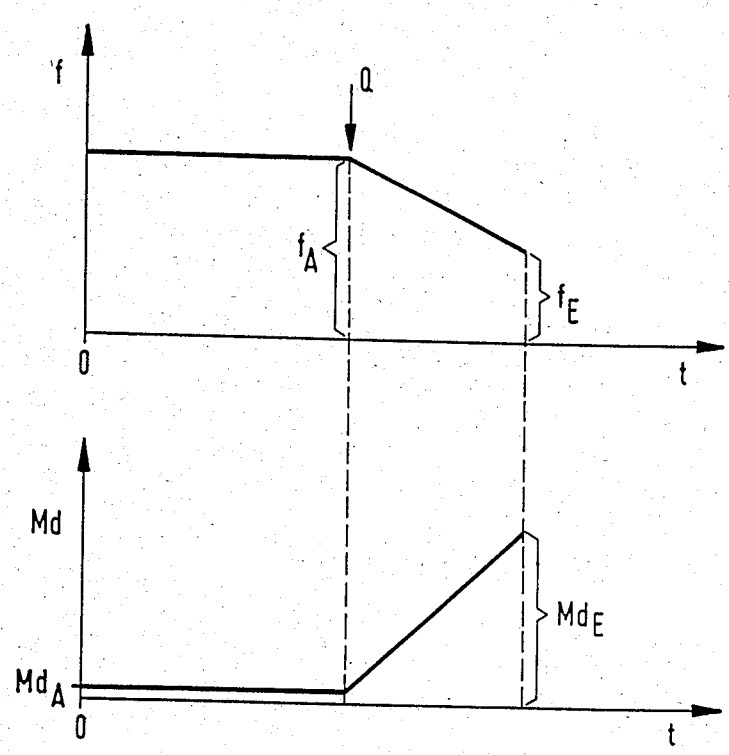

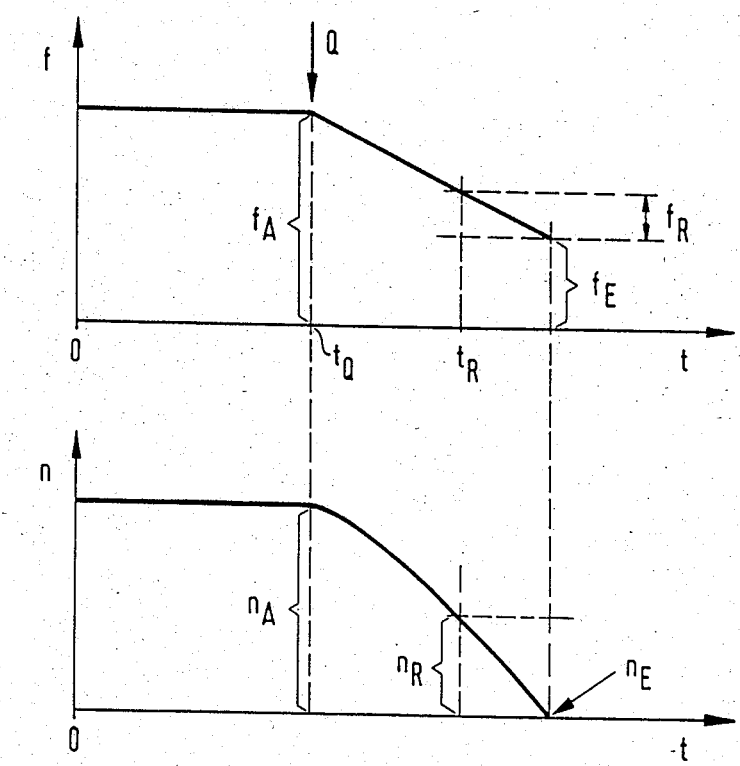

APPARATUS FOR PRODUCING AN AXIAL CLAMPING FORCE FOR ROTATING SPINDLES, AND A METHOD OF OPERATION FOR AN APPARATUS OF THIS KIND

The invention relates to an apparatus for producing an axial operating force for the clamping of tools or workpieces in work spindles, which are adapted to be driven rotationally, while the spindles are stationary, which apparatus comprises a motor whose output torque is converted by means of a screw mechanism rotating with the work spindle into the axial operating force.

It is well known that modern cutting tools permit very high cutting powers at extremely high speeds of rotation, and that for the purpose correspondingly shortening set-up and nonproductive times machine tools (lathes, drilling and milling machines) are being increasingly fitted with powered clamping devices.

The resulting requirements can be summarized as follows:

Because of the high speeds correspondingly high clamping forces must be applied in order to compensate for the centrifugal force of the clamp jaws. The clamping force should be adjustable with great accuracy, firstly for reasons of safety and secondly to enable full use to be made of the reserve of clamping force, and finally in order to be able to ensure adaptation to, for example, different wall thicknesses of workpieces. The clamping itself should be effected with great efficiency and with short relative expenditure of time. Costs for manufacture, servicing and replacement of worn parts should be low, and the powered clamping device should be capable of the most versatile possible use, for example being usable both for solid spindles and for hollow spindles.

Powered clamping devices are known in which the clamping energy is produced pneumatically, hydraulically or electrically. Technical details can be seen in the work "Kraftbetätigte Spannzeuge" (Power Operated Clamping Devices) by Johann Lukowski, Carl Hanser Verlag, Munich 1965. While the pneumatic devices still favoured in this publication have in the meantime declined in importance, at the present time increasing use is made of hydraulic power clamping devices side by side with electric clamping devices.

The present state of the art where hydraulic clamping devices are concerned is documented in the house publications of Firma Paul Forkardt, No. 421.01.3D/1981 "Umlaufende Druckölzylinder OZR" (Rotary Hydraulic Cylinders OZR) and No. 422.01.2.D/1981, Hydraulic clamping devices of this kind make it possible to produce very high clamping forces; it is however a disadvantage that a hydraulic circuit must be formed, this requiring considerable expense for apparatus and for energy. The electrical or electronic control system generally employed in modern machine tools cannot directly operate hydraulic clamping devices, and electrohydraulic transducers, such as solenoid valves, are required. The cost of servicing is considerable. It can be seen that hydraulic clamping devices can only incompletely comply with the requirements indicated above.

The present state of the art where electric clamping devices are concerned is documented in the house publication of Paul Forkardt KG No. 500.01.7D/1979 "Elektrospanner" (Electric Clamping Devices). These comprise an electric motor, which for the clamping of tools, for example in milling machines, can be stationary and be coupled up only for the clamping operation, but which in lathes can also be arranged to rotate with the spindle. The output torque of the motor is transmitted via reduction gearing and a torque limiter to the nut of a screw mechanism which cooperates with a push-pull tube.

The most important disadvantage of known electric clamping devices consists in that the adjustment of the clamping force in the mechanical torque limiter is inaccurate and difficult and must be made manually, so that it is time consuming and can scarcely be automated. In addition, it is scarcely possible for these devices to be made in the form of hollow spindle clamping devices, for reasons which will be explained in detail below.

The problem underlying the invention is that of so developing the clamping device of the same kind that simple, very accurate and reproducible adjustment of the clamping force is made possible, while the general requirements indicated above can all be met.

The invention is based on the realization that the disadvantages of the known electric clamping devices are due primarily to the fact that the rotating movement is converted into a translatory clamping movement, that is to say are due to the sliding screw mechanism conventionally employed.

In the following example a flat screwthread is assumed for the sake of simplicity. The application of the rather complicated formulae for the usual V-thread (ISO/R 68), however, leads to only inconsiderable differences in the numerical results of the examples given. The dimension designations used here can be seen from FIGS. 12a, 12b of the drawings.

In order to produce an axial force $F_a$ on the push-pull tube a torque $M_d$ must be applied on the periphery of the screwthread flanks with the flank diameter D and a pitch h, in accordance with the relationship $$M_d = F_a \frac{D}{2} \tan (\beta + \phi), \qquad (1)$$

where $\beta$ is the lead angle of the screw mechanism, with $$\beta = \arctan \frac{h}{\pi D} \qquad (2)$$

and $\phi$ is the angle of friction with $$\phi = \arctan \mu \qquad (3)$$

$\mu$ being the coefficient of friction of the parts sliding on one another. For the sake of simplicity other frictional influences will be ignored here.

For small values of $\beta$ and $\phi$, which can here be assumed, it is possible to approximate (1) in accordance with $$M_d = F_a h \frac{1}{2\pi} + F_a \frac{D}{2\mu} \qquad (4)$$

$$= M_{dS} + M_{dR} \qquad (5)$$

where the term $M_{dS}$ represents the proportion actually applied to clamping and $M_{dR}$ the proportion comprising frictional losses.

In (4) it is noteworthy that the clamping term is independent of D, while the loss term increases in proportion to D. The greater the flank diameter, the more unfavourable the proportions will become; clamping devices having sliding screw mechanisms have therefore hitherto not be built for hollow spindles.

If the ratio of the two proportions to one another is now examined with the aid of concrete numerical values, a ratio of $M_{ds}$ to $M_{dR}$ of about 1:7 is found for a solid spindle with D=30 mm, h=2 mm, and $\mu$=0.15. For a hollow spindle with D=80 mm the ratio is about 1:19 when the other data are unchanged.

This means that by far the major part of the installed power of the motor is not utilized for producing the clamping force. It further means that the clamping force produced is determined to a very considerable extent by the coefficients of friction acting at a given amount; with a well lubricated and clean sliding screw mechanism it can be expected that $\mu$ will be equal to 0.1, while in the event of inadequate serving $\mu$ will be equal to 0.2 or even worse. It may also occur that a determined torque, adjusted manually on the torque limiter, may be too high in dependence on the state of lubrication of the sliding screw mechanism for one and the same workpiece, so that the workpiece will be damaged, or may be too low, to ensure firm clamping. Accurate predetermination of the clamping force is not possible. The unavoidable overdimensioning of the motor in such cases obviously leads to still further disadvantages. Apart from poor economy, this affects in particular corotating motors, because it lengthens the time required for the spindle to run up to speed and to be braked as the result of the increase in the moment of inertia, while in the case of very high spindle speeds the extremely high centrifugal forces have the consequence that limits for the strength of the components of the motor are very quickly reached.

Another disadvantage of the known electric clamping devices occurs even when the clamping motor does not corotate. In sliding screw mechanisms, in fact, the difference in the coefficients of friction for static friction and sliding friction is relatively great, so that the clamping operation does not take place continuously but always in a stick-slip pattern.

The disadvantages mentioned do not occur in the case of the construction according to the invention. With a rolling screw mechanism, in fact, an extremely low coefficient of friction of the order of $\mu$=0.002 is obtained. It can easily be calculated that the ratio of clamping power to loss for the diameters indicated above (D=30 mm and D=80 mm) will amount to about 10:1 and 4:1 respectively, these values being largely independent of the state of maintenance of the mechanism, while in addition no stick-slip behaviour occurs.

The major part of the installed motor power is therefore utilized for clamping and—even more importantly—this proportion can be calculated in advance and is reproducible. In other words, therefore, the invention makes it possible to control the clamping force through an operating parameter of the motor; a manually adjustable torque limiter is not now required. The further advantages resulting from this fact will be discussed later on below.

In the first place it should be pointed out that the low level of friction of the rolling screw mechanism has the consequence that this mechanism is usually not selflocking. Since the rotating part of the rolling screw mechanism is however subjected to torques, resulting from mass, in the unclamping direction either during starting up or during braking of the spindle, and/or forces from the clamping produce a retroaction, the clamped condition must be secured by a locking means. This means may be positive or frictional, and it can also be made engageable. It is preferably combined with a clamping force storage means, such as a spring storage means.

From the above assessments it is immediately clear that the power to be installed for a given clamping force in the case of the apparatus according to the invention need amount to only a fraction of the power of the conventional electric clamping device. This permits several advantages: in the first place, if the clamping motor is to rotate with the spindle, its moment of inertia can be very low, while secondly the advantage is gained that it is possible to use commercially available adjusting motors which are used in numerical control systems in machine tools, and which are simply coupled mechanically or electromagnetically to the rolling screw mechanism for the clamping operation. Since, as already mentioned above, the operating parameters of the motor determine the clamping force or, as will be explained in detail below, the clamping force itself can be controlled, with the motor forming the adjusting drive of the control circuit, the clamping force control system can easily be integrated in the numerical control system of the entire machine.

The integration of the control of the clamping device in the usual numerical control system can even go still further and permits a method of operating for the clamping of tools or workpieces which was not known hitherto. As is well known, numerical controls are designed for position control, that is to say the actual position of a control element is compared with the desired position and the remaining position difference controls the adjusting drive in such a manner that as the position difference becomes smaller (that is to say approximation to the desired position), the drive runs increasingly slowly. In order to be able to control the apparatus according to the invention with the same control means, the clamping force achieved at any given moment must therefor be converted into a path, for example by clamping an elastic member whose force-path characteristic is known, the path achieved at any given moment then being detected by means of known measuring devices. Since it is in any case preferred to provide a clamping force storage means in the form of a spring, the measuring device can be provided directly on this storage means, although this is not indispensable. The measuring device can then transmit the actual value of the position, representing the clamping force as a known function, at the moment in question to the numerical control system, and this value can be evaluated in the same way as in conventional position control systems.

With regard to the construction of the rolling screw mechanism, reference is made to the publication by Müller-Gerbes and Ernst, "Maschinenelemente zum Umformen drehender in geradlinige Bewegungen" (Machine elements for converting rotary into rectilinear movements) in WERKSTATT UND BETRIEB 1978, pp. 65–77.

In addition to the two possible arrangements of the corotating motor and the motor coupled only in the stationary state, there is yet another solution, in which the stator of the motor is stationary, whereas the rotor rotates with the spindle and with the rolling screw mechanism. The nut of the rolling screw mechanism can then form an integral component with the rotor.

The clamping motor is needed only when the spindle is stationary. It is therefore possible for the spindle drive motor, which is used during the rotation of the spindle, to be uncoupled and used as clamping motor when the spindle is stationary.

Examples of embodiment of the subject of the invention are explained more fully below with reference to the accompanying drawings.

In order to make it possible always to use the same terminology in the various examples of embodiment, a definition will first be given of the three basic elements cooperating with one another (see also FIGS. 12a and 12b of the drawing):

The "spindle" referred to is the work spindle of the machine, and can rotate, but for the clamping operation is assumed to be stationary, and this term includes the components connected to the spindle.

The "nut" referred to as part of the rolling screw mechanism is the component provided with the internal screwthread.

The "sleeve" referred to as part of the rolling screw mechanism is the component provided with the appertaining external screwthread.

One of the two components comprising the nut and sleeve performs an axial movement relative to the spindle during the clamping; one of these two components at the same time makes a rotary movement relative to the spindle. It is possible for the same component to make both the rotary movement and the axial movement. The transmission members in the form of balls or rollers are provided between the screwthreads of the nut and of the sleeve.

The present invention resides in apparatus for producing and monitoring an axial operating force for clamping a tool or work piece to a rotatable work spindle while the spindle is stationary. A roller worm gear mechanism is corotatable with the spindle and includes a first member rotatable relative to the spindle and a second member displaceable along the spindle for transmitting clamping force in response to rotation of said first member. The apparatus further includes a motor which has a stationary stator and a rotor for rotating said first member relative to the spindle, force storage means associated with said mechanism and corotatable with the spindle for storing said clamping force, a locking mechanism for locking the clamping mechanism in clamping positions, mechanism for controlling said locking mechanism, and a force measuring device associated with said controlling mechanism for measuring said clamping force.

The present invention also relates to a method for controlling an axial operating force for clamping a tool or workpiece to a rotatable spindle and comprises the steps of maintaining the spindle in a stationary position, driving with a stationary motor, a rotatable member comprising part of a roller worm gear mechanism to axially displace another member comprising a part of said mechanism to transmit said axial operating force, loading by means of said other member, measuring the force stored within a force storage element, comparing said measured force with a predetermined force value, and stopping said motor upon coincidence of said measured force with said predetermined force value.

Figure 2:
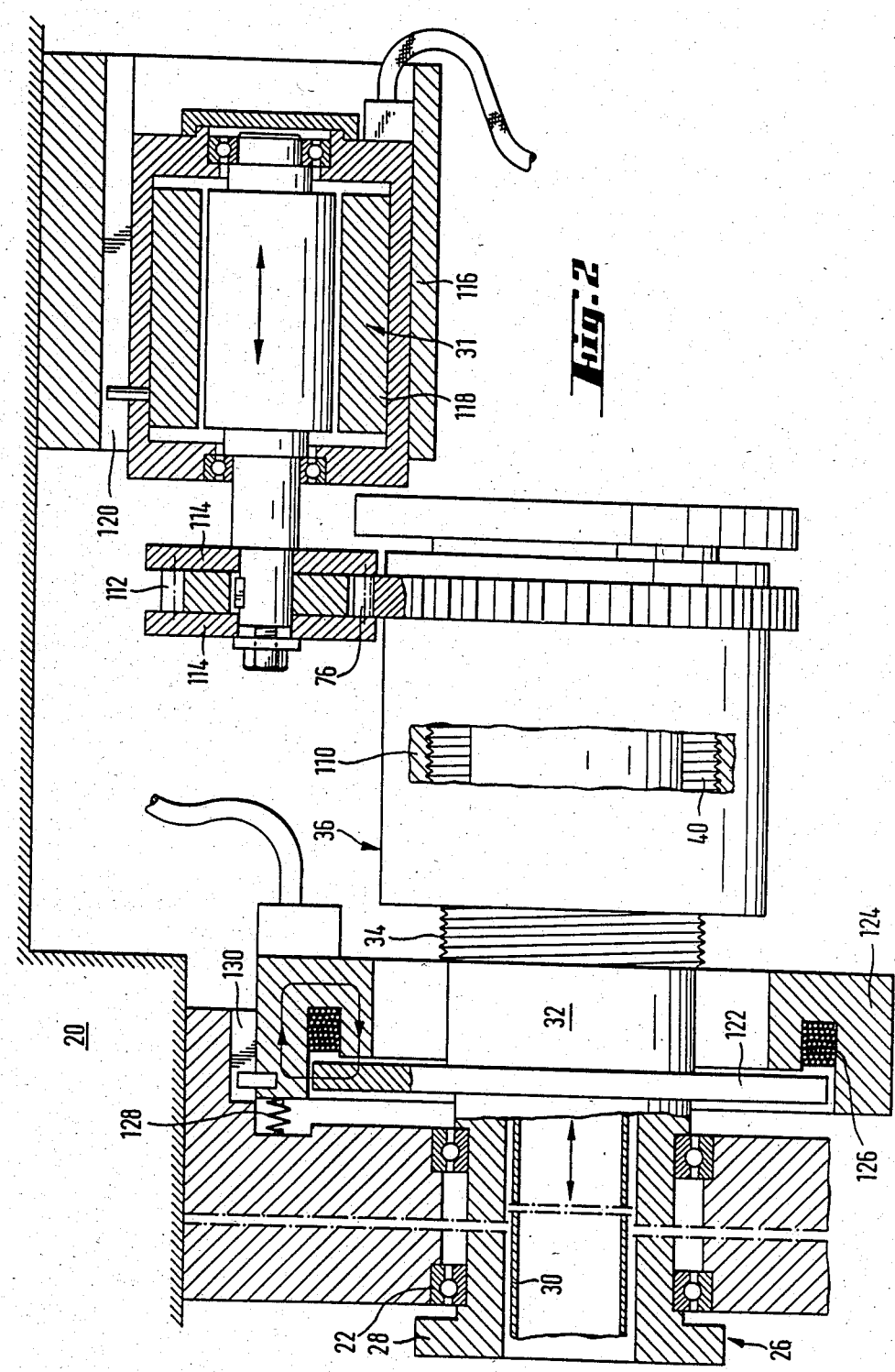
Figure 3:
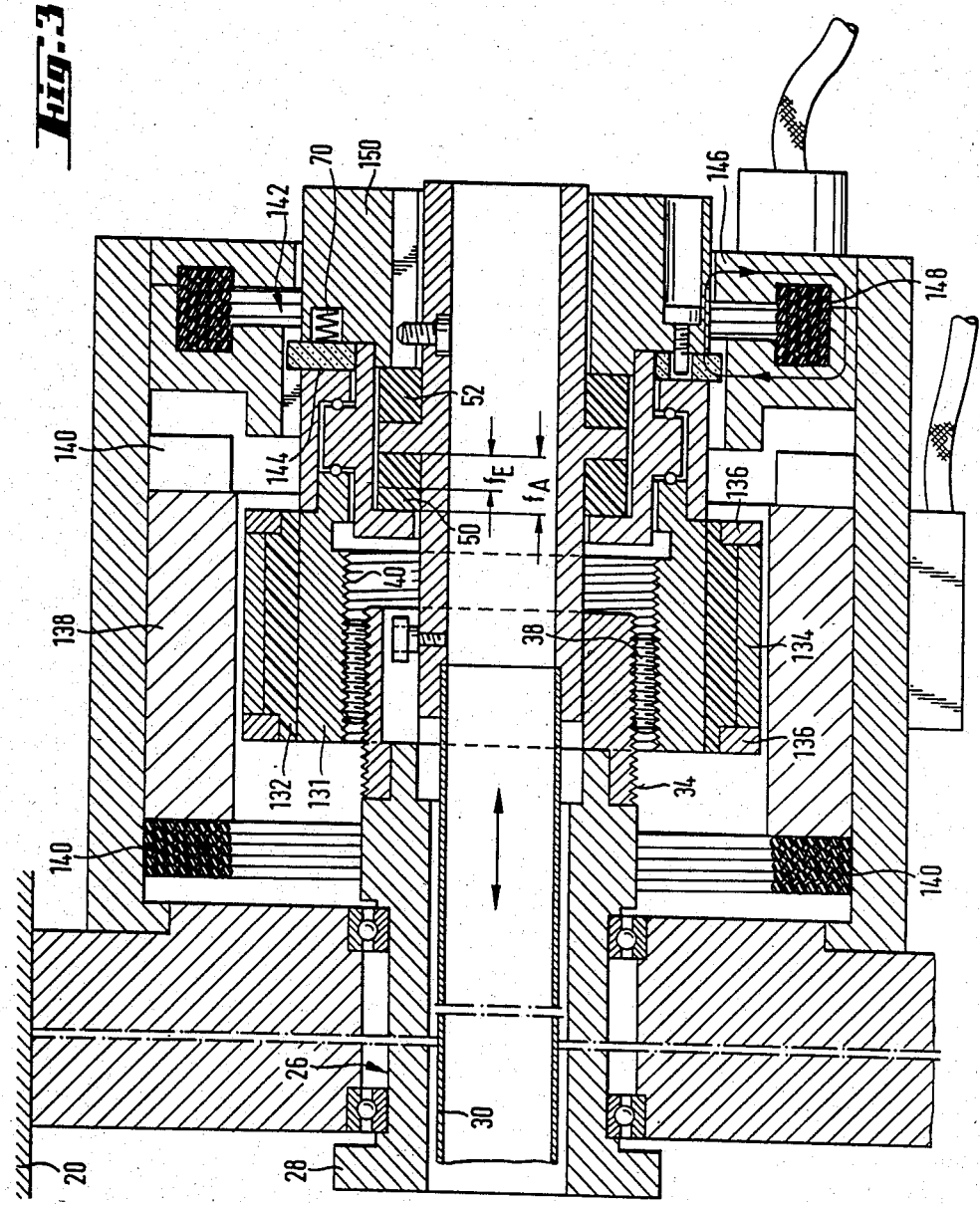
Figure 4:
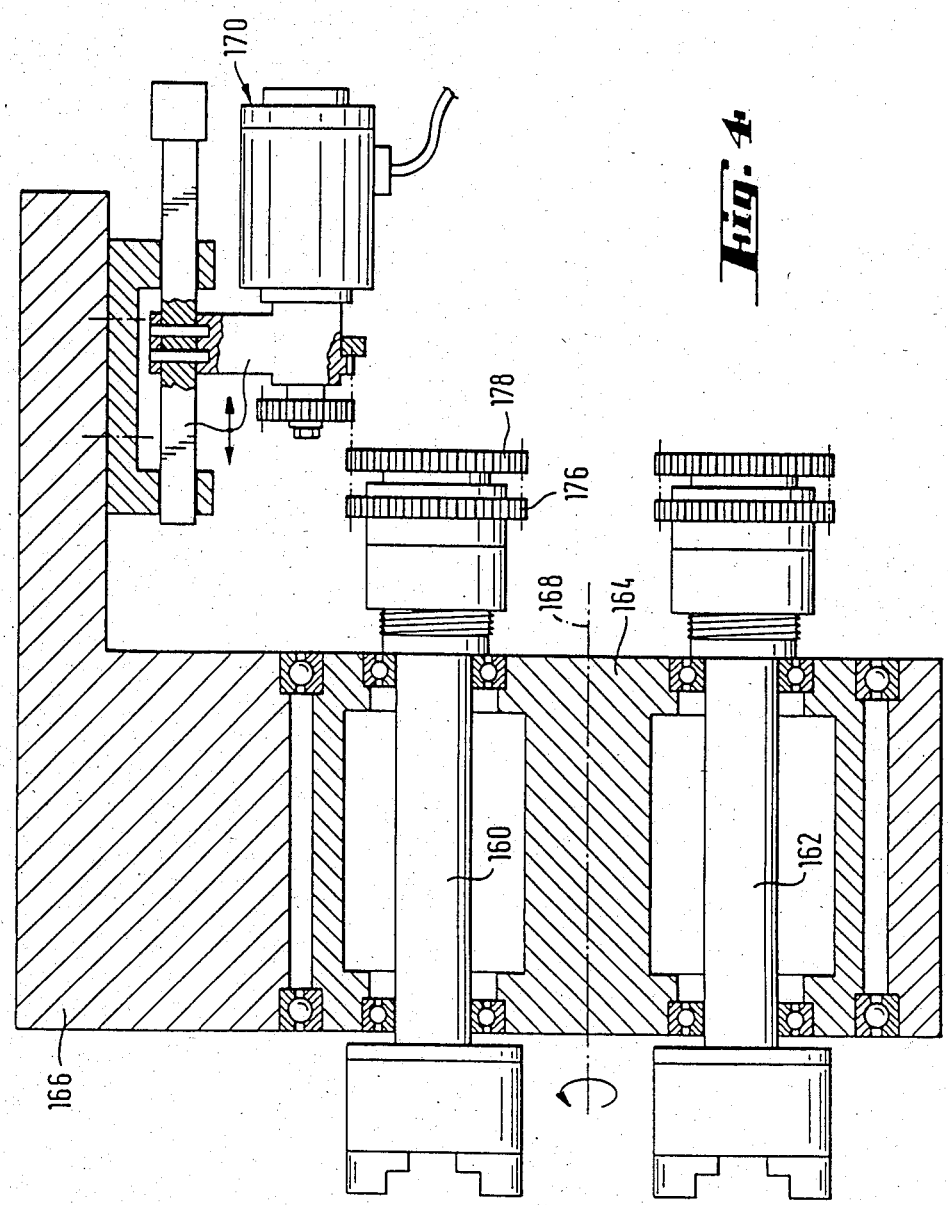
Figure 5:
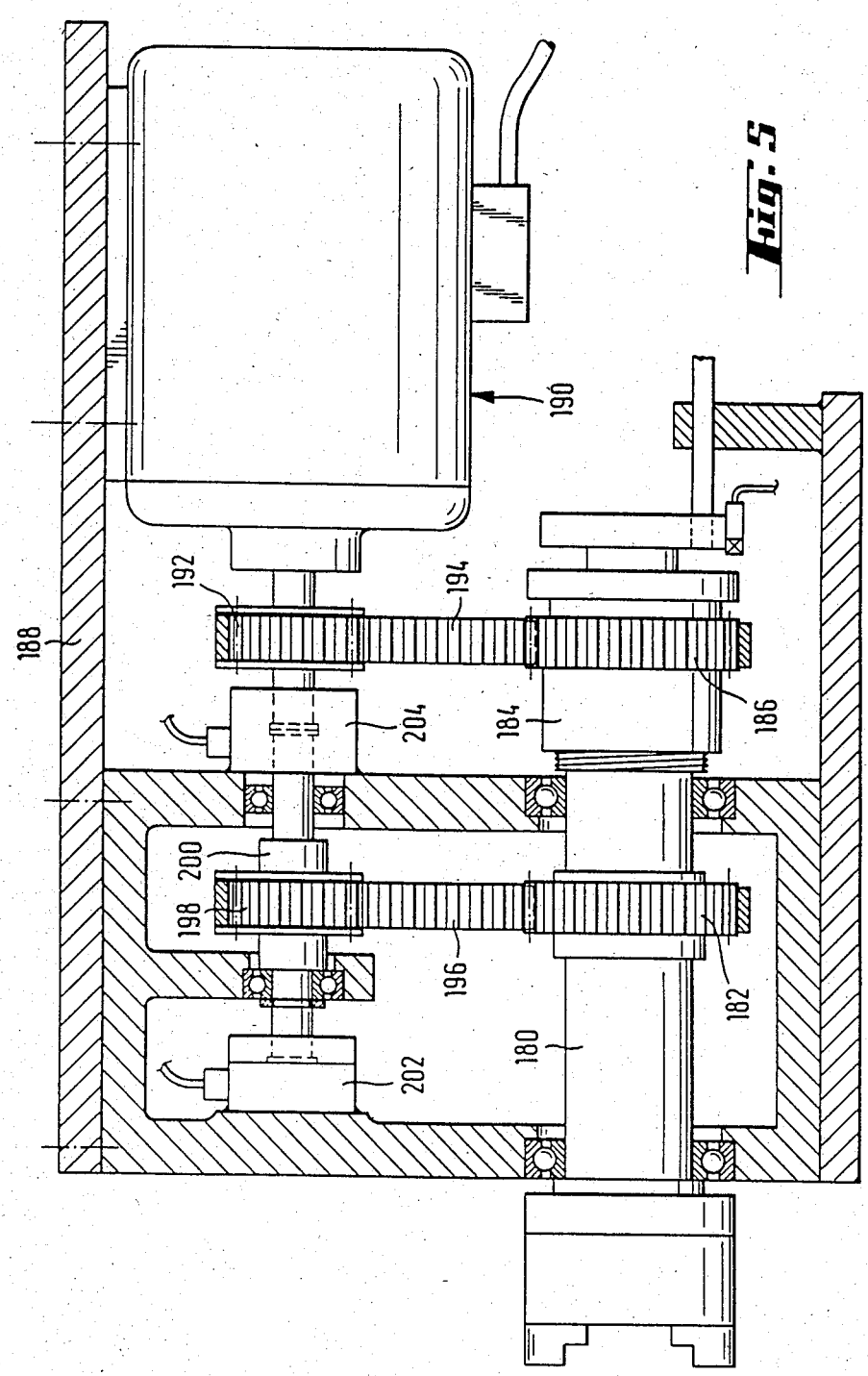
Figure 6:
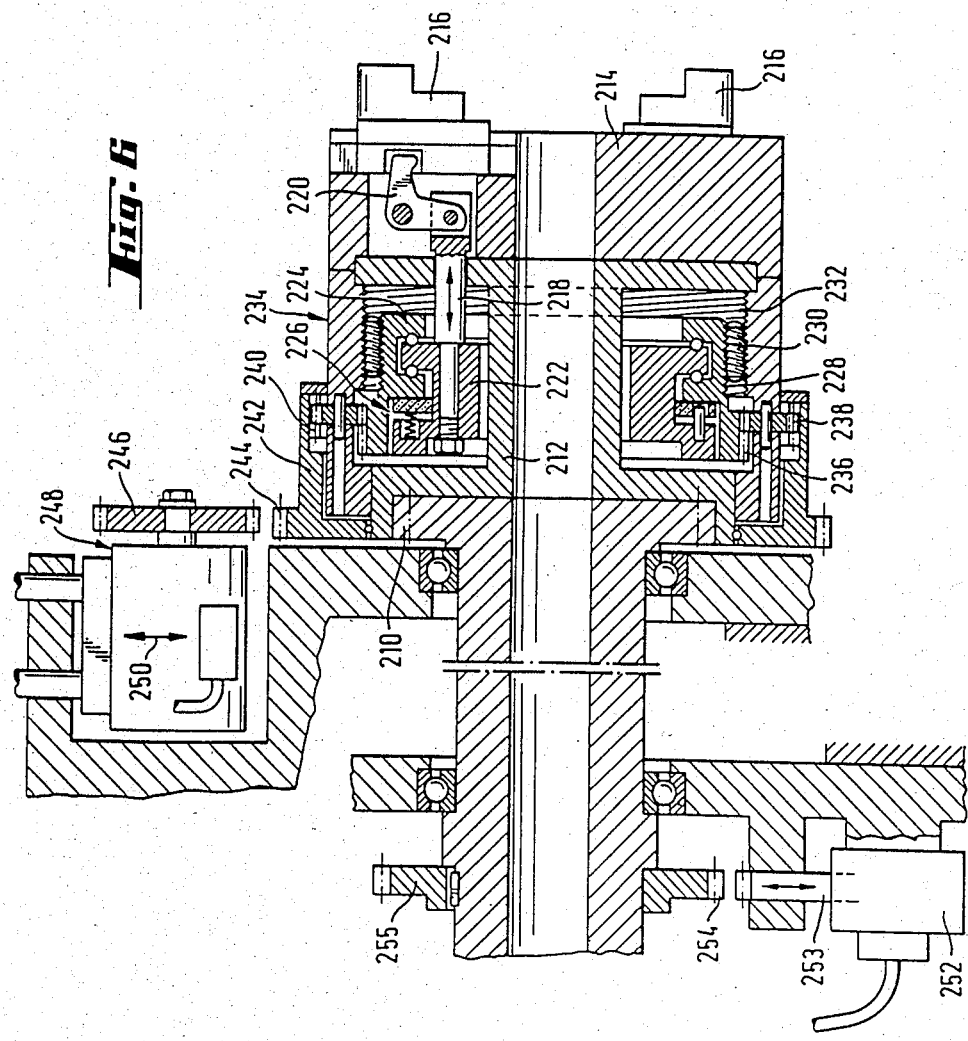
Figure 7:
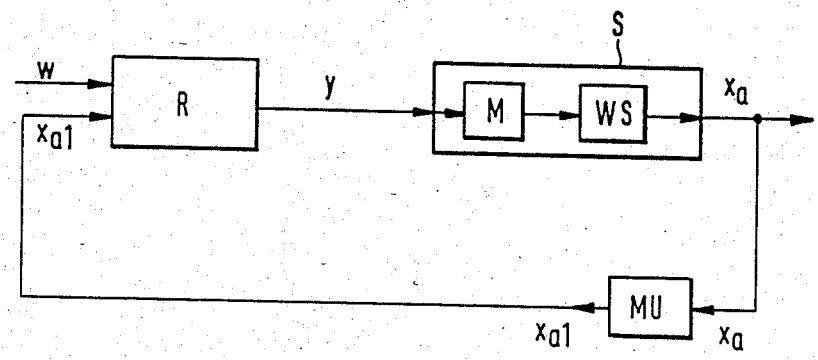
Figure 8:
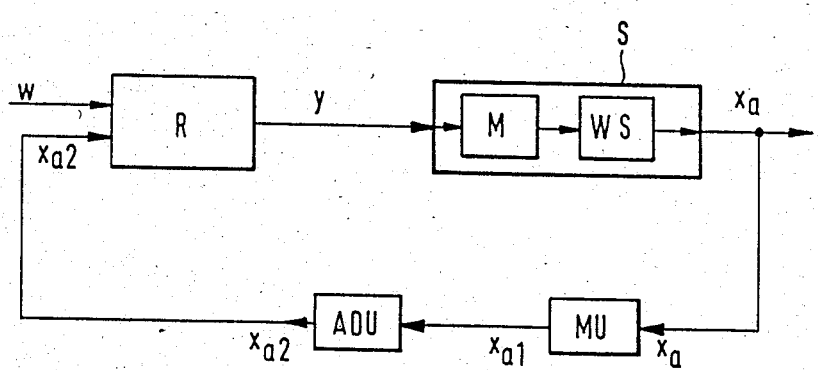
Figure 9:
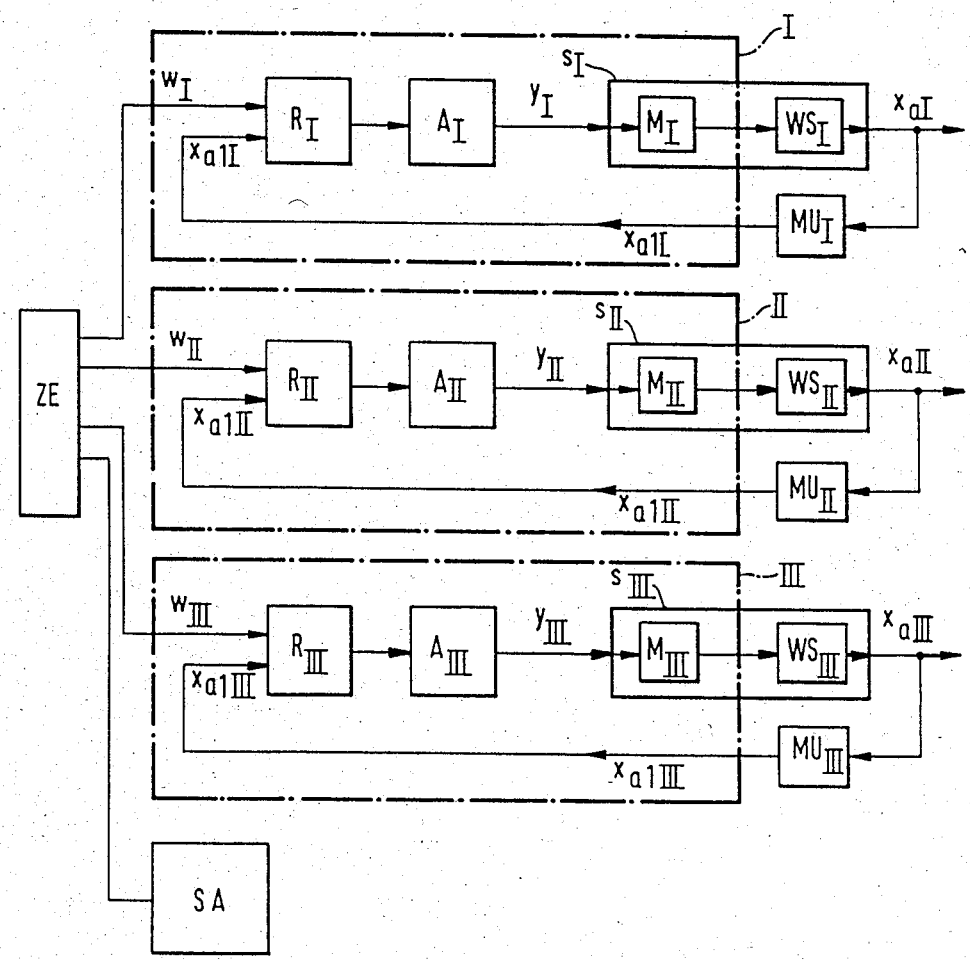
Figure 12A:
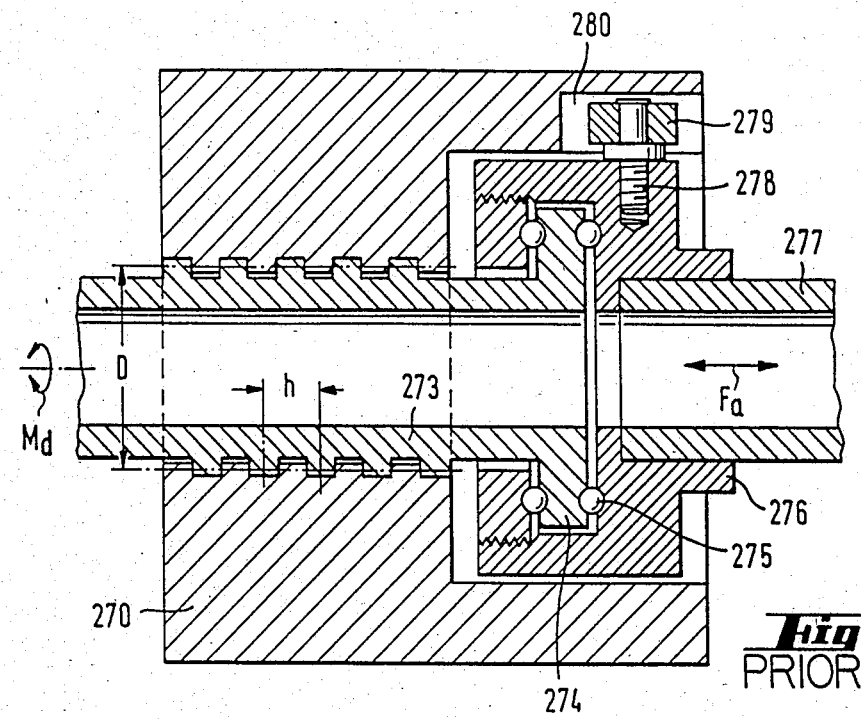
Figure 12B:
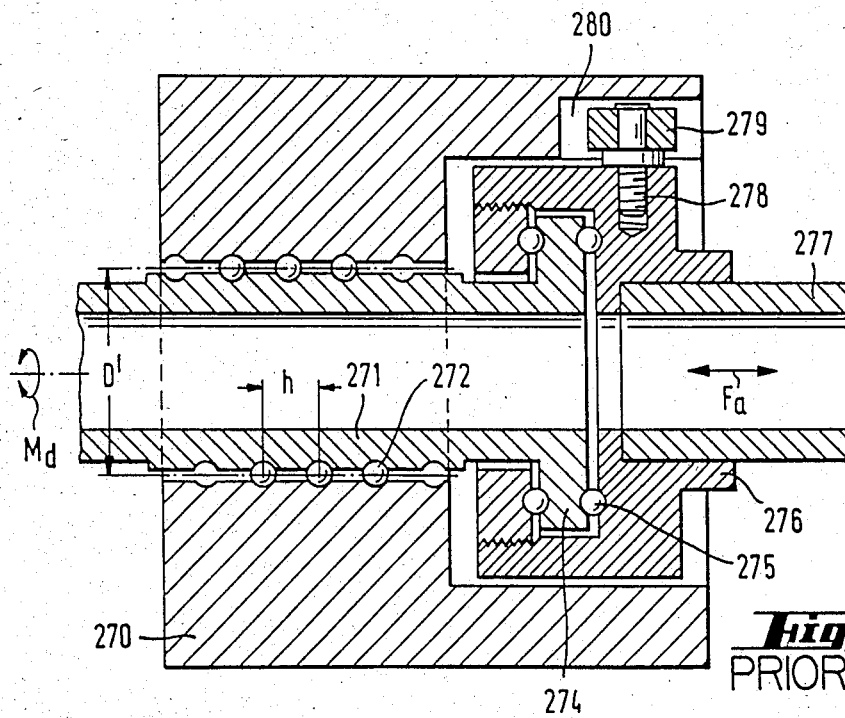

FIG. 1 shows in the form of a largely schematic longitudinal section a first form of construction of an apparatus according to the invention, FIG. 2 shows similarly a second example of embodiment, FIG. 3 similarly shows a third embodiment, FIG. 4 shows the embodiment in an automatic multi-spindle machine, FIG. 5 shows another embodiment, FIG. 6 shows another embodiment in a so-called front end chuck, FIG. 6a is an axial section of the apparatus according to the invention with a metal spring as force storage means, FIGS. 7 and 8 are block diagrams of control circuits explaining the possible methods utilizing the apparatus according to the invention, FIG. 9 is the block diagram of a numerical control system for a lathe, this system also covering the clamping operation, FIGS. 10 and 11 are respective graphic representations of the time curve of the mechanical parameter factors in the two possible methods of operation, and FIGS. 12a and 12b show respectively the conventional screw mechanism and the rolling screw mechanism, for the purpose of illustrating the differences.

FIG. 1 shows the apparatus in conjunction with the work spindle of a lathe. The machine frame 20 supports, with the aid of rolling contact bearings 22, the work spindle 26 in the headstock 24. The left-hand end in the drawing, the "nose" 28 of the spindle, carries the chuck body (not shown) of a chuck, for example a three-jaw chuck, whose clamp jaws are adapted to be operated by the axial movement of a push-pull tube 30 relative to the spindle 26.

This axial displacement is transmitted by means of the clamping motor 31 to the tube 30 in the manner described below.

The spindle 26 carries the sleeve 32 provided with the rolling external screwthread 34; the spindle 26 and the sleeve 32 are rigidly connected together, while the nut 36, which is adapted to roll by its internal screwthread 40 on the external screwthread 34 with the interposition of the rollers 38 serving as transmission or rolling members, thereby undergoes an axial displacement relative to the spindle, which displacement is to be transmitted to the tube 30.

The tube 30 is rigidly connected to a driver sleeve 42, which is joined to the spindle 26 in such a manner as to rotate conjointly with the latter owing to the fact that a roller 44 mounted on the periphery of the sleeve 42 engages in an internal longitudinal groove 46 in the sleeve 32.

An outwardly projecting peripheral flange 48 on the sleeve 42 is embedded sandwich fashion between two elastomer rings 50 and 52, whose end faces remote from the flange 48 are supported by inwardly projecting shoulders 54 and 56 respectively on an intermediate ring 58. The intermediate ring 58 also rotates conjointly with the spindle 26, the tube 30, the sleeve 32 and the sleeve 42, since from the latter a pin or key 60 disposed on its periphery engages in a corresponding axially parallel groove 62 in the intermediate ring 58.

The nut 36 is mounted by means of ball bearings 66 on an external flange 64 of the intermediate ring 58 in such a manner that the intermediate ring participates in the axial movements of the nut and transmits them, via the elastomer ring 50 or 52 which is compressed at the moment in question, to the sleeve 42 and thus finally to the tube 30, the axial travel of the tube being equal to that of the nut minus the compression stroke of the respective elastomer ring. The elastomer ring compressed at the moment in question thus serves as a clamping force storage means. (It is obvious that a clamping force storage means of this kind or of another type can also be disposed elsewhere in the force flow or reaction force flow).

At its end remote from the tube 30 the intermediate ring 58 is provided with another external flange 68, which will be referred to as an abutment flange, because it serves to support compression springs 70 which press a brake ring 72 against the nut 36. The brake ring is rotationally coupled to the abutment flange 68 by means of driver pins 74. Only one spring 70 and one driver pin 74 are shown in the drawing; it is obvious that a multiplicity of these parts are provided, preferably distributed alternately on the periphery of the abutment flange 68.

The nut 36 has an external toothed rim 76, while the abutment flange similarly has an external toothed rim 78. The clamping motor 31 is flanged on a carriage 80, which is movable by means of a linear drive 82 along a guide 84 disposed on the machine frame 20, parallel to the axis of the spindle 26. The carriage carries a toothed segment or simply a pawl 86, which on the displacement of the carriage 80 to the left in the drawing by means of the drive 82 comes into engagement with the toothed rim 78 of the abutment flange and secures it against rotation. At the same time the output pinion 88 on the shaft of the clamping motor 31 comes into engagement with the toothed rim 76 on the nut 36; the toothings to be coupled are provided with profiles facilitating their engagement.

It will be assumed that, starting from the position shown in the drawing, a workpiece has to be clamped in the chuck (not shown), and that for this purpose the push-pull tube is to be moved to the left relative to the spindle. For this purpose the carriage 80 is moved to the left until the clamping motor can turn the nut 36 relative to the abutment flange 68, which is signalled by the running of the stop block 90 onto the flange 68. The drive 82 is then stopped in such a manner that the carriage 80 is freed and can then follow the movements of the nut 36 or of the abutment flange 68.

During the idling movement of the chuck, that is to say as long as contact has not yet been made between the clamp jaws and the workpiece, the tube 30 is relatively easily movable relative to the spindle 26, so that the axial displacement of the nut 36 is at first transmitted to the drive sleeve 42, in consequence of its rolling on the sleeve 32, with slight, negligible compression of the elastomer ring 52; the two parts therefore move to the left and carry with them the carriage 80 together with the motor 31. As soon as the jaws lie against the workpiece, the tube 30 can practically no longer continue its axial movement, so that the further rotation of the nut 36 now leads to an axial relative movement of the nut in relation to the sleeve 42, compressing the elastomer ring 52.

When the motor 31 is switched off, the force stored in the elastomer ring 52 is also the clamping force transmitted to the tube 30 and acting on the jaws of the chuck.

If the force-path relationship of the elastomer ring is known, the magnitude of the relative axial displacement between the tube 30 and the nut 36 is a measure of the stored clamping force, and in order to be able to determine this axial displacement a measuring ring 94, supported by means of rolling contact bearings 92 and not corotating, is fastened on the end of the sleeve 42 remote from the chuck. It carries a position detector 96, which makes it possible to determine the distance "d" and whose output can be fed via a cable 98 to a processing circuit (not shown). The position "p" of the push-pull tube 30 relative to the machine frame at any given moment, on the other hand, is determined by means of two additional detectors 100, 102, which are fastened in stationary positions on the frame 20 and between which a tripping device 104, which is mounted on a rod 106 driven by the measuring ring 94, is adapted to move.

The friction brake 67-70-72-74 holds the nut 36, in the angular position which it has reached at the moment in question, secure against retroacting torques which because of inertia or because of reactions from the clamping system would tend to change the clamped position reached by the tube 30. (This continuously acting friction brake can also be provided at other points in the arrangement, or the easy running characteristic of the rolling screw mechanism can even be controlled proportionately). The drive 82 of the carriage 80 can be controlled by bringing the output pinion 88 of the motor 31 into engagement with the toothed rim 78 of the abutment flange, instead of with the toothed rim 76 of the nut 36. With the spindle drive stationary, the entire spindle can then be turned by means of the motor 31. Since the motor is preferably adapted to be stopped in a planned manner, this makes it possible to turn the spindle to any desired angular position, for example a position in which one jaw of the chuck has reached its lowest position. The angular position of the spindle at any given moment can be determined by providing on the side of the toothed rim 78 remote from the motor 31 an inductive transducer 108, which through its output cable controls for example a programmable counter.

The embodiment shown in FIG. 2 coincides to a large extent with FIG. 1, and therefore only the differences from the latter will be explained.

It is first possible to see the "positive" screwthread turns 34 of the sleeve 32, and in the region of the cutout 110 can be seen the internal screwthread turns 40' of the nut, which are here "negative", that is to say have a winding direction opposite to that of the sleeve. If the two screwthreads had the same pitch, no axial movement at all of the nut 36 would be produced. If however, as in the present case, the screwthread pitches are selected to be (slightly) different, i.e. for example +2 mm/360° for the sleeve and −2.5 mm/360° for the nut, a difference will be obtained—in this example 0.5 mm/360°—in accordance with which the axial displacement is then effected. In this way extreme reduction ratios can be achieved without the screwthread turns requiring to have a correspondingly slight depth.

Whereas in the embodiment shown in FIG. 1 the rotor of the clamping motor 31 was brought into operative connection with the spindle only when the latter was stationary, in the embodiment shown in FIG. 2 the output pinion 112 of the motor 31 meshes continuously with the toothed rim 76 of the nut 36 and, supported by flanges 114 on the toothed rim, hauls the motor 31, following the axial movements of the nut 36. The entire motor 31 is accordingly disposed in a carriage guide 116 and its stator 118 is supported against rotation by means of a straight guide 120.

During the work operation the rotor of the motor accordingly rotates continuously in synchronism with the rotation of the spindle. If the clamping work has to be done while the spindle is stationary, the spindle itself must be held fast. For this reason it is provided with a holding flange 122, which forms the armature of an electromagnetic brake. The yoke 124 of the brake, with the winding 126, is put into circuit at the same time as the clamping motor and, against the action of compression springs 128 (of which only one is shown in the drawing), bears against the holding flange; since the yoke is supported against rotation by the straight guide 130, the rotation of the spindle is thus also prevented. The force flow for the clamping drive thus passes from the stator of the clamping motor to the rotor of the latter, from the rotor to the nut 36, and via the electromagnetic clutch 122/124 back to the stator. The coupling between the motor 31 and the rolling screw mechanism is accordingly made electromagnetically and without contact. An arrangement of this kind is shown in FIG. 3, and for its explanation once again only the differences from FIG. 1 will be discussed.

An insulating tube 132, which carries the rods 134 and short-circuiting rings 136 of the motor rotor, is mounted on the nut 130 of the rolling screw mechanism. The nut 130 is accordingly itself a part of the motor rotor. The stator, with the poles 138 and winding 140, is stationary and disposed coaxially to the rotor.

In addition, in this embodiment, in contrast to FIG. 1, the movement lock for maintaining the clamped state is operative only when the clamping motor is switched off. The friction brake 142, which here again serves as movement lock, is in principle of the same construction as in FIG. 1, but the brake lining carrier 144 is of magnetizable material and is in the form of an armature of an electromagnet whose yoke 146 is disposed in such a manner that on the energization of its winding 148 the brake lining carrier 144 is lifted off the nut 36 against the action of the compressions springs 70, owing to the fact that the air gap of the magnetic circuit is thereby made smaller. As can be seen, the arrangement is such that this action will occur irrespective of the axial position of the nut 36 relative to the yoke 146; the abutment flange 150 is made correspondingly longer. It can further be seen that the operation of the magnet gives rise to no problems, since it will free the nut when the clamping motor is also put into operation; the two systems are accordingly placed under voltage simultaneously.

In the embodiment shown in FIG. 3 no brake is shown for the spindle, which of course must not turn during the clamping operations. This is based on the fact that the spindle is permanently coupled to its own drive motor and that the latter is provided with a brake which comes into operation when the motors is switched off, thus holding the spindle fast.

In FIG. 3 the two different thicknesses $f_A$ and $f_E$ of the elastomer spring 50 in the relaxed and in the clamped state of the clamping system are indicated; these thicknesses will be discussed in the description to be given below of FIGS. 10 and 11.

FIG. 4 illustrates the application of the apparatus to a multispindle machine. The spindles 160 and 162 (there may of course be more than two spindles) are mounted in a spindle drum 164, which in turn is rotatable in the machine frame 166 about its axis 168 in a stepwise manner. In each thus adjustable angular position of the drum 164 the single clamping motor 170 provided can thus be brought into operative connection with that spindle (here the spindle 160) whose rim gears 176, 178 are then in alignment with the clamping motor. The construction of the spindles and that of the motor, together with the suspension of the latter, correspond to those shown in FIG. 1.

In the embodiments described thus far a clamping motor adapted to be operated separately has been provided. Since however the clamping work has to be done while the work spindle is stationary and since the latter obviously also has a drive motor which is not then in operation, it is possible to make use of the spindle drive motor as clamping motor when the spindle is stationary.

An embodiment of this kind is illustrated schematically in FIG. 5. The spindle 180 carries a cogged belt pulley 182, and the nut 184 also carries a cogged pulley 186. The single motor 190 fastened in a stationary position on the machine frame 188 carries on its output shaft a cogged belt pinion 192 which drives the nut via the cogged belt 194 when a clamping operation is to be carried out; the spindle is then held fast against rotation owing to the fact that its cogged belt pulley 182 is operatively connected by the cogged belt 196 to a cogged belt pinion 198 which is keyed on an auxiliary shaft 200 and is braked by means of the electromagnetic clutch 202 when the latter is energized. The auxiliary shaft 200 lies in alignment with the output shaft of the motor 190 and is adapted to be drivingly connected to the said output shaft by means of a second electromagnetically engageable clutch 204. When therefore the clutch 202 is deenergized and instead the clutch 204 is energized, the motor drives, via the two cogged belts, both the spindle 180 and the nut 184. It will be understood that in this operating phase the nut and the spindle must turn at exactly the same speed; the two cogged belt pulleys and the two cogged belt pinions are therefore respectively identical. It is not possible to work with simple V-belts, because in that case the unavoidable tolerances would result in the gradual accumulation of a rotational angle difference between spindle and nut, which would either slacken the clamping system or damage the system through excessive clamping.

FIG. 6 shows the application of the apparatus according to the invention to a so-called "front end chuck", that is to say a type of chuck in which the drive members for the chuck jaws are disposed on the chuck end of the spindle.

An intermediate carrier 212 is flanged on the spindle nose 210, while the actual chuck body 214 is mounted on the end of the said intermediate carrier remote from the spindle. The chuck used here is a three-jaw chuck whose clamp jaws 216 are guided radially relative to the chuck body 214, while the clamping movement of the jaws is transmitted by respective push-pull pins 218 by way of angle levers 220. This construction for a front end chuck is known per se.

The three pins 218 are screwed to an abutment ring 222, on which the sleeve 224 is mounted in a rolling contact bearing and disposed coaxially. The construction and arrangement of the brake unit 226 correspond in principle to the embodiment shown in FIG. 1. The sleeve 224 with its rolling screwthread 228 can roll, via the transmission members—rolling rollers 230—on the internal screwthread 232 of the nut 234, thereby transmitting an axial movement to the abutment ring 222 and thus to the pins 218. The nut 234 is made fast to the intermediate carrier and thus also to the spindle nose 210. The sleeve 224 is provided with a toothed rim 236, with which mesh transmission pinions 238 mounted on the periphery of the intermediate carrier 212, the said pinions in turn meshing with the internal toothing 240 of a coupling ring 242. The output pinion 246 of the clamping motor 248 can be brought into operative connection with the external toothed rim 244 of the said coupling ring when a clamping operation is to be carried out; for this purpose the motor is adapted to move radially relative to the spindle axis, in the direction of the arrow 250. When the motor is in this manner brought into engagement with the coupling ring 242, the spindle must at the same time be braked to secure it against rotation. For this purpose a spindle locking magnet 252 is provided, whose armature 253, when energized, drops as a locking pawl into the toothing 254 of a rim gear 255 mounted on the spindle.

A particular advantage of this construction consists in that full use can be made of the spindle bore for bar work. Another advantage is to be seen in the fact that the rolling screw mechanism not only converts the rotary movement of the sleeve 224 into an axial movement of the abutment ring 222, but also takes over the function of a straight guide for the central member which is to be provided for the purpose of deriving therefrom the jaw movements, which in front end chucks is usually difficult because of the short constructional length.

In the embodiments described so far elastomer springs were used as force storage means. Such springs can only be loaded in compression, so that if it should be necessary to clamp in both directions two such elastomer blocks would have to be provided. Metal springs, on the other hand, if suitably designed, can be loaded both in tension and in compression. An embodiment using a metal force storage spring is shown in longitudinal section in FIG. 6a.

At the rear end of a hollow spindle 300 a carrier sleeve 302 is mounted as an extension, and serves as carrier for two units which are displaceable relative to one another. The first unit, whose elements are made fast to one another, comprises rings 304 and 306, a corrugated tube spring 308, and the rolling screw mechanism nut 310.

The entire first unit is rotatable relative to the carrier sleeve 302 and is supported on the latter by means of a ball bearing 312 and also by means of a first ball guide 314; the ball bearing 312 remains axially fixed relative to the spindle axis, while the end of the corrugated tube spring remote from it and the components connected thereto can travel along the spindle axis and therefore need a ball guide as support.

The second unit comprises the rolling screw mechanism sleeve 324 and the push-pull tube 334 connected to it. The second unit is supported by means of a second ball guide 326 on the inside of the carrier sleeve 302, being longitudinally displaceable relative to the latter, while a relative rotary movement between these two parts is prevented by means of a fitting key 328 acting as driving key and engaging in a longitudinal groove in the sleeve 324.

The rolling elements of the rolling screw mechanism 310/324 are here threaded rollers 332 in engagement with the internal screwthread 322 of the nut 310 and with the external screwthread 330 of the sleeve 324.

In order to be able to initiate a rotary movement, the ring 304 carries a toothed rim 316; undesired rotary movements are prevented by a brake system consisting of a brake ring 318 bearing against spring preloaded pins 320.

When the spindle is stationary a drive (not shown in the drawing) is coupled to the toothed rim 316 and by means of the latter the first abovementioned unit is turned relative to the carrier sleeve 302. Through the action of the rolling screw mechanism the rolling screw mechanism sleeve 324 is thus moved, for example, to the right from the lefthand end position here shown in the drawing, thus carrying with it the push-pull tube 334. As soon as the latter is braked or locked, for example when the clamp jaws operated by the tube 334 strike against a workpiece, the sleeve 324 is unable to move further, and the nut 310 then begins to move along the rolling screw mechanism in the axial direction, to the left in the present case, so that the corrugated tube spring 308 is deformed and thus acts as a clamping force storage means. This action also occurs when the clamping operation takes place in the opposite direction, since the corrugated tube spring can serves as a force storage means both under tensile and under compressive load. The measurement of the stored force can be made similarly to the arrangement shown in FIG. 1.

The corrugated tube spring is made of a metal having a known modulus of elasticity and is dimensioned in accordance with a desired force-path characteristic. For this it is preferred to use a precipitation-hardened wrought aluminium alloy, since in the first place such an alloy has a high yield point: tensile force ratio, while in the second place it is readily machinable. It is obvious that the profile shape shown in FIG. 6a is to be regarded as purely schematic; in practice the internal edges will be radiussed in order to reduce notch loading. Another advantage of the use of aluminium is the reduction of mass and thus of moment of inertia. Since in addition the dimensions are larger, for example in comparison with steel, machining tolerances have less effect.

From the explanation of the embodiments it can be seen that there are numerous possible constructional configurations; thus, the nut may be stationary relative to the spindle, in which case the sleeve performs both the relative rotary movement and the relative axial movement (FIG. 6), but it is also possible for either the sleeve or the nut to be only rotatable in relation to the spindle, while the other of these two parts is only axially displaceable in relation to the spindle (an embodiment of this kind is not illustrated). In FIGS. 1 to 5, on the other hand, the sleeve is stationary relative to the spindle, while the nut makes both rotary and axial moments in relation to the spindle.

In many cases in the drawings components integrally joined together are shown as they are expediently made up from separate components assembled together in order to build the entire arrangement. Where this is not the case, the specialist will of his own accord readily see where the parts are to be separated.

As explained above, the clamping system can be integrated in a control circuit, of which FIGS. 7 and 8 each show one form of construction. The command variable w, which is a measure of the clamping force to be applied to the push-pull tube or pin, is fed to the control device R. The control device R compares the command variable with the controlled variable $x_a$, which by means of a measuring transducer MU is converted into a corresponding signal $x_a$, and the control device produces a corresponding manipulated variable y which is applied to the clamping motor M, which in turn operates the rolling screw mechanism WS. The clamping motor M and the rolling screw mechanism WS together form the controlled system S of the process. The measuring transducer can determine the clamping force by detecting the elastic deformation of any member lying in the clamping force flow, preferably of the spring storing the clamping force. In FIG. 8 an analog-digital converter is connected between the measuring transducer and the control device, this converter supplying a digital signal $s_{a2}$ in cases where the control device and the motor are designed for digital operation; it is obvious that the command variable w is then also in digital form.

FIG. 9 shows in block diagram form the entire control system for a lathe, in which the two control circuits "I" and "II" respectively are provided for the two coordinates of the tool compound slide, and a control circuit "III" is provided for the clamping system, in accordance with FIG. 7 (or FIG. 8). The central unit ZE supplies the three command variables $w_I$, $w_{II}$, $w_{III}$ in accordance with the program fed in, and at the same time controls the time sequence of the individual processes, including the spindle drive SA.

If the clamping system is used in a tool spindle in, for example, a drilling or milling machine, in which more than two coordinates are to be predetermined, the number of control circuits is increased accordingly.

It is obvious that the signals supplied by the measuring transducer $MU_{III}$ are so arranged that the individual control circuits can be identical with one another, including the respective motors. This simplifies the construction and maintenance of these components and the holding of stocks of parts.

FIG. 10 shows the time sequence of the clamping operation. In the upper part of the Figure the axial dimension of the spring—for example the spring 52 in FIG. 1 or FIG. 3—is plotted on the time axis (abscissa), this being in turn a measure of the compressive force and hence of the clamping force, larger forces obviously corresponding to smaller axial dimensions; the connection need not be linear at all. In the lower part of the Figure the appertaining output torque of the clamping motor is shown.

At the moment of time t-O it will be assumed that the clamping motor starts to turn. Until the clamp jaws make contact with the workpiece or tool which is to be clamped, the motor has to overcome only the (slight) moment of friction with its initial torque $Md_A$, and the spring is scarcely noticeably compressed in comparison with its nominal thickness $f_A$. At the moment of time Q it will be assumed that contact is made between the clamp jaws and the workpiece or tool. The motor must now apply to the rolling screw mechanism a sharply increasing torque, and the spring is increasingly compressed. When the axial dimension of the spring has reached the value $f_E$, the output torque of the motor amounts to $Md_E$, and by calibration it is possible to determine the value of $f_E$ at which $Md_E$ provides exactly the desired clamping force, when the value $f_E$ is to be used as switch-off signal. This is to be preferred, because, although the easily measurable electric power input of the motor is likewise a measure of $Md_E$, nevertheless the variable frictional losses and the efficiency of the motor must also be taken into account.

The upper part of FIG. 11 is identical with the upper part of FIG. 10. In the lower part, however, the curve of the rotational speed n of the motor is plotted. At the moment of time at which the compression of the spring reaches $f_E$ the speed of the motor should be exactly $n_E=0$. In order to achieve this, the speed can be reduced "parallel" to the measure f; the "residual path" $f_R$ at the moment of time $t_R$ can then in each given case be fed as preset value for the motor speed $u_R$ to the control system of the machine.

FIGS. 12a and 12b differ only in respect of the construction of the actual screw mechanism. FIG. 12a shows a sliding screw mechanism with the flank diameter "D" and the pitch "h", the screwthread being flat, while the "sleeve" 273 (which is here hollow only as an example) and the "nut" 270 have a rectangular thread profile.

When a torque Md is applied, an axial force $F_a$ is here produced and transmitted to the push-pull tube 277. In order to allow the push-pull tube to make only an axial movement without rotating, an axial ball bearing, consisting of the sleeve flange 274, the balls 275 and the outer bearing ring 276, is installed between the sleeve and the push-pull tube. The outer bearing ring also carries a pin 278 carrying a roller 279, which can roll in a groove 280 in the nut 270, thereby preventing a rotation of the outer bearing ring relative to the nut 270.

FIG. 12b shows a rolling screw mechanism with the "sleeve" 271 (which here is shown hollow only as an example), the nut 270, and the "transmission members" 272.

In the example illustrated the rolling screw mechanism is in the form of a ball screw mechanism. The transmission members 272 are here balls, which run on a rolling diameter "D" in spherically shaped grooves which are formed with great precision in spiral form and with the same pitch "h" on the outer cylinder of the sleeve 271 and in the inner cylinder of the nut 270. When the sleeve rotates relative to the nut, the balls roll between the inner and outer grooves, while at the same time an axial displacement of nut and sleeve relative to one another takes place. The torque $M_d$ and the axial force $F_a$ are linked by the formula $$M_d = \frac{F_a \cdot h}{2\pi}.$$

For the conversion of the torque into an axial force, a very low frictional torque has to be applied, which is of the order of that of an axial rolling contact bearing with the rolling diameter "D". The low frictional torque is caused by the rolling operation of the balls.

The ball screw mechanism shown in FIG. 12b constitutes only one of various possible forms of construction of rolling screw mechanisms. Another type is for example the roller screw mechanism. In this case the spiral grooves of spherical shape are replaced by threaded grooves having a triangular thread profile, and the balls are replaced by rollers provided with an external screwthread. Here again the rollers transmit the forces between sleeve and nut in a rolling movement, with likewise very high efficiency.

In ball screw mechanisms in accordance with FIG. 12b, in which a lengthy axial displacement of the sleeve 271 must be made, recirculation of the balls is customary, although this is not shown in FIG. 12b, because there it is assumed that only small axial displacements are made, for which no provision need be made for the recirculation of the balls.

I claim:

1. Apparatus for producing and monitoring an axial force in a machine having a rotary spindle and clamping means carried by the spindle for clamping a tool or workpiece to the spindle, said apparatus comprising a roller worm gear mechanism coaxially supported on the spindle and including a threaded first member supported for coaxial rotation with and relative to the spindle and a threaded second member supported for rotation with and axial displacement along the spindle and relative to said first member and a plurality of threaded rollers disposed between and threadably enagaged with said first member and said second member for axially displacing said second member along said spindle in response to rotation of the first member relative to the second member, drive means for rotating said first member relative to said second member, force storage means supported for rotation with said spindle and movement to a force storing position in response to force transmitted thereto by axial displacement of said second member relative to said first member, means for measuring the force produced by the axial displacement of said second member relative to said first member, control means responsive to said measuring means for stopping the rotation of said first member relative to said second member when a predetermined force is produced, and locking means carried by said spindle for retaining said force storing means in said force storing position.

2. Apparatus as claimed in claim 1 wherein said drive means comprises a motor mounted in stationary position on the machine and having a rotor and a stator and said apparatus includes means for coupling said rotor to said roller worm gear mechanism.

3. Apparatus as claimed in claim 2, wherein said coupling means includes a mechanical clutch.

4. Apparatus as claimed in claim 2, wherein said coupling means includes an electromagnetic clutch.

5. Apparatus as claimed in claim 1 reduction gearing providing a drive connection between said motor and said roller worm gear mechanism.

6. An apparatus as claimed in claim 1, wherein the force storage means comprises a spring.

7. Apparatus as claimed in claim 6, wherein the spring comprises a corrugated tubular metal spring of precipitation-hardened aluminum alloy.

8. Apparatus as claimed in claim 6, wherein the spring comprises an elastomer spring.

9. An apparatus as claimed in claim 1 wherein at least a part of the measuring means is arranged to corotate with the spindle.

10. An apparatus as claimed in claim 1, wherein the force storage means comprises an elastically deformable element in which the deformation path is a known function of the stored force, and wherein the measuring means is designed to detect the deformation path.

11. Apparatus as claimed in claim 1, wherein said drive means comprises a drive motor for the spindle.

12. Apparatus as claimed in claim 1, wherein said drive means comprises a motor having a stator and a rotor and said stator, said rotor and said spindle are disposed coaxially to one another.

13. Apparatus as claimed in claim 12, wherein said rotor comprises a nut forming a part of the roller worm gear mechanism.

14. Apparatus as claimed in claim 1, wherein said roller worm gear mechanism comprises a differential screw mechanism.

15. Apparatus as claimed in claim 1 wherein said apparatus includes a push-pull tube to which said axial operating force is applied and said force measuring means includes means for sensing the position of said push-pull tube.

16. Apparatus as claimed in claim 1, wherein said apparatus includes a chuck having a body comprising a part of said roller worm gear mechanism.

17. Apparatus as claimed in claim 16 wherein said chuck comprises a front end chuck of a lathe having clamping jaws and axially movable pins for operating the respective jaws and said pins are connected to said second member to move therewith.

18. Apparatus as claimed in claim 2 for a machine having a plurality of axially parallel work spindles, said apparatus having only one motor and means for supporting said one motor relative to said spindles for alignment in driving engagement with said roller worm gear mechanism associated with each one of said spindles.

19. Apparatus as claimed in claim 1, wherein said spindle comprises a hollow spindle.

20. A method for controlling an operating force applied to a tool or workpiece in a machine having a rotatable spindle and operating means carried by the spindle for applying force to the tool or workpiece and comprising the steps of providing a roller worm gear mechanism including a threaded rotatable member, a threaded other member axially displacable relative to said rotatable member and a plurality of threaded rollers disposed between and threadably engaged with said rotatable member and said other member for axially displacing said other member in response to rotation of said rotatable member, force storage means for receiving and storing force applied thereto, and means for transmitting said force from said force storage means to said operating means, means supporting said roller worm gear mechanism on the spindle for corotation with said spindle with said rotatable member supported for coaxial rotation relative to the spindle and the other member supported for axial displacement along the spindle, supporting said force storage means on said spindle to receive force transmitted thereto by axial displacement of said other member, maintaining the spindle in a stationary position, rotating said rotatable member relative to the spindle and said other member to axially displace said other member and load said force storgage means, measuring the force stored in said force storing means comparing the value of the measured force with a predetermined force value and stopping the rotation of said rotatable member when said measured force value coincides with said predetermined force value.

21. An apparatus for carrying out the method claimed in claim 20, which apparatus is a part of a numerical control system constructed of standard components for controllers and motors.

22. A method as claimed in claim 20 including the additional steps of converting the measured value of said force by a force-path converter into a measured value of distance, and reducing the rotational speed of the motor in dependence upon the residual measured distance until a distance corresponding to the desired clamping force is reached.

23. An apparatus for carrying out the method claimed in claim 22, wherein said force-path converter comprises a spring which also serves at the same time as said clamping force storage means.

* * * * *